(12) United States Patent
Silver et al.

(10) Patent No.: US 9,776,897 B2
(45) Date of Patent: Oct. 3, 2017

(54) SYSTEMS AND DEVICES FOR TREATING WATER, WASTEWATER AND OTHER BIODEGRADABLE MATTER

(76) Inventors: Matthew Silver, Cambridge, MA (US); Justin Buck, Cambridge, MA (US); Noah Taylor, Boston, MA (US)

( * ) Notice: Subject to any disclaimer, the term of this patent is extended or adjusted under 35 U.S.C. 154(b) by 287 days.

(21) Appl. No.: 13/378,763

(22) PCT Filed: Feb. 24, 2010

(86) PCT No.: PCT/US2010/025224
§ 371 (c)(1),
(2), (4) Date: Feb. 14, 2012

(87) PCT Pub. No.: WO2010/147683
PCT Pub. Date: Dec. 23, 2010

(65) Prior Publication Data
US 2012/0132521 A1 May 31, 2012

Related U.S. Application Data

(60) Provisional application No. 61/187,469, filed on Jun. 16, 2009, provisional application No. 61/245,085, (Continued)

(51) Int. Cl.
*C02F 3/28* (2006.01)
*C25B 3/00* (2006.01)
(Continued)

(52) U.S. Cl.
CPC ............... *C02F 3/28* (2013.01); *C02F 3/005* (2013.01); *C02F 3/006* (2013.01); *C02F 3/302* (2013.01);
(Continued)

(58) Field of Classification Search
CPC .. C02F 3/005; C02F 3/28; C02F 3/006; C02F 3/302; C02F 3/303; C02F 2209/02;
(Continued)

(56) References Cited

U.S. PATENT DOCUMENTS

| 4,090,940 A | 5/1978 | Switzgable |
| 8,440,438 B2 * | 5/2013 | Cheng et al. ................. 435/167 |

(Continued)

FOREIGN PATENT DOCUMENTS

| CN | 101849180 A | 9/2010 |
| EP | 573226 A1 | 12/1993 |

(Continued)

OTHER PUBLICATIONS

Kuroda et al. CO2 Reduction to Methane and Acetate using a Bio-electro Reactor with Immobilized Methanogens and Homoacetogens on Electrodes. Energy Convers. Mgmt. vol. 36, No. 6-9, pp. 787-790.*

(Continued)

*Primary Examiner* — Ciel Thomas
(74) *Attorney, Agent, or Firm* — Capitol Patent & Trademark Law Firm, PLLC

(57) ABSTRACT

The invention relates to bio-electrochemical systems for the generation of methane from organic material and for reducing chemical oxygen demand and nitrogenous waste through denitrification. The invention further relates to an electrode for use in, and a system for, the adaptive control of bio-electrochemical systems as well as a fuel cell.

34 Claims, 12 Drawing Sheets

Related U.S. Application Data filed on Sep. 23, 2009, provisional application No. 61/267,594, filed on Dec. 8, 2009.

(51) Int. Cl.

| | | |
|---|---|---|
| C25B 9/00 | (2006.01) | |
| C25B 11/03 | (2006.01) | |
| H01M 8/16 | (2006.01) | |
| C02F 3/00 | (2006.01) | |
| C02F 3/30 | (2006.01) | |
| C25B 15/08 | (2006.01) | |
| C02F 3/04 | (2006.01) | |
| H01M 8/04089 | (2016.01) | |

(52) U.S. Cl.
CPC ............... *C02F 3/303* (2013.01); *C25B 3/00* (2013.01); *C25B 9/00* (2013.01); *C25B 11/03* (2013.01); *C25B 15/08* (2013.01); *H01M 8/16* (2013.01); *C02F 3/04* (2013.01); *C02F 2209/02* (2013.01); *C02F 2209/06* (2013.01); *C02F 2209/08* (2013.01); *C02F 2209/14* (2013.01); *C02F 2209/15* (2013.01); *C02F 2209/22* (2013.01); *C02F 2303/10* (2013.01); *H01M 8/04089* (2013.01); *Y02E 50/343* (2013.01); *Y02E 60/527* (2013.01); *Y02W 10/15* (2015.05); *Y02W 10/30* (2015.05)

(58) Field of Classification Search
CPC .............. C02F 2209/06; C02F 2209/08; C02F 2209/14; C02F 2209/15; C02F 2209/22; C02F 2303/10; C25B 3/00; C25B 9/00; C25B 11/03; C25B 15/08; H01M 8/16; H01M 8/04089; Y02W 10/15; Y02W 10/30; Y02E 50/343; Y02E 60/527
See application file for complete search history.

(56) References Cited

U.S. PATENT DOCUMENTS

| | | | |
|---|---|---|---|
| 2001/0003276 A1* | 6/2001 | De Souza et al. ............... | 123/3 |
| 2005/0183964 A1* | 8/2005 | Roberts et al. ............... | 205/701 |
| 2005/0255345 A1 | 11/2005 | Gerritse et al. | |
| 2007/0259217 A1* | 11/2007 | Logan ..................... | H01M 4/90 429/2 |
| 2009/0130734 A1 | 5/2009 | Mets | |
| 2009/0142627 A1* | 6/2009 | Shimomura et al. ............. | 429/2 |
| 2010/0270158 A1* | 10/2010 | Logan ..................... | C02F 1/469 204/522 |
| 2011/0165667 A1 | 7/2011 | Mets | |

FOREIGN PATENT DOCUMENTS

| | | |
|---|---|---|
| JP | 08138978 A | 5/1996 |
| JP | H10-230293 A | 9/1998 |
| JP | 11-010184 | 1/1999 |
| JP | 11-010184 H | 1/1999 |
| JP | H11-216496 A | 8/1999 |
| JP | H11-253993 A | 9/1999 |
| JP | 2000-051894 A | 2/2000 |
| JP | 2000-157995 A | 6/2000 |
| JP | 2001-145896 A | 5/2001 |
| JP | 2002-086189 A | 3/2002 |
| JP | 2002-520032 A | 7/2002 |
| JP | 2002520032 A | 7/2002 |
| JP | 2005-125172 A | 5/2005 |
| JP | 2006-35158 | 2/2006 |
| JP | 2007-117995 A | 5/2007 |
| JP | 2007-227216 A | 9/2007 |
| JP | 2008-114191 A | 5/2008 |
| WO | WO-0003447 A1 | 1/2000 |
| WO | 2004004036 A2 | 1/2004 |
| WO | 2008059331 A2 | 5/2008 |
| WO | WO-2009042631 A2 | 4/2009 |
| WO | WO-2009072887 A1 | 6/2009 |
| WO | WO-2009131452 A1 | 10/2009 |
| WO | 2009155587 A2 | 12/2009 |
| WO | WO-2010044983 A2 | 4/2010 |
| WO | WO-2010147683 A1 | 12/2010 |
| WO | WO-2011000084 A1 | 1/2011 |
| WO | WO-2011003081 A1 | 1/2011 |
| WO | WO-2012011984 A1 | 1/2012 |

OTHER PUBLICATIONS

Kim, Hyung Joo et al., "A Microbial Fuel Cell Type Lactate Biosensor Using a Metal-Reducing Bacterium, Shewanella putrefaciens," Journal of Microbiology and Biotechnology, vol. 9, No. 3, pp. 365-367, Dec. 11, 1999.

International Search Report and Written Opinion from PCT/US2010/059554 dated Sep. 26, 2011.

Korneel Rabaey et al., "Microbial fuel cells: novel biotechnology for energy generation", TRENDS in Biotechnology vol. 23, No. 6, pp. 292-298 (2005).

International Search Report and Written Opinion from PCT/US2010/025224 dated Oct. 12, 2010.

Cheng, et al., "Direct Biological Conversion of Electrical Current into Methane by Electromethanogenesis," Environmental Science and Technology, American Chemical Society, vol. 43, No. 10, pp. 3953-3958 (Mar. 26, 2009).

Extended European Search Report issued by the European Patent Office for European Application No. 10789884.3 dated May 16, 2013 (10 pgs.).

Arnold, et al., "Regulation of Dissimilatory Fe(III) Reduction Activity in *Shewanella putrefaciens,*" *App and Env Microbiol*, vol. 56, No. 9, pp. 2811-2817 (Sep. 1990).

Beliaev, et al., "Global transcriptome analysis of Shewanella oneidensis MR-1 exposed to different terminal electron acceptors," *J Bacteriol*, vol. 187, No. 20, pp. 7138-7145 (Oct. 2005).

Bendikov, et al., "Development and Environmental Application of a Nitrate Selective Microsensor Based on Doped Polypyrrole Films," Sensors and Actuators, vol. 106, No. 2 (May 13, 2005), 7 pages.

Bergel, et al., "Catalysis of Oxygen Reduction in PEM Fuel Cell by Seawater Biofilm." Electrochem. Commun., vol. 7(9), pp. 900-904 (2005).

Biffinger, et al., "A Biofilm Enhanced Miniature Microbial Fuel Cell Using Shewanella Oneidensis DSP10 and Oxygen Reduction Cathodes," *Biosensors and Bioelectronics*, vol. 22, pp. 1672-1679 (2007).

Bourgeois, et al., "On-Line Monitoring of Wastewater Quality: A Review," *Journal of Chemical Technology & Biotechnology*, vol. 76, pp. 337-348 (2001).

Bretschger, et al., "Current Production and Metal Oxide Reduction by Shewanella oneidensis MR-1 Wild Type and Mutants," *App and Env Microbiol*, vol. 73, No. 21, pp. 7003-7012 (2007), including "Erratum," *App and Env Microbiol*, vol. 74, No. 2, pp. 553 (2008); 11 pages.

Call, D. and Logan, B. E., "Hydrogen production in a single chamber microbial electrolysis cell lacking a membrane," Environ. Sci. Technol., vol. 42, pp. 3401-3406 (2008).

Chang, et al., "Improvement of a microbial fuel cell performance as a BOD sensor using respiratory inhibitors," *Biosensors and Bioelectronics*, vol. 20, pp. 1856-1859 (2005).

Chang, I. et al , "Continuous determination of biochemical oxygen demand using microbial fuel cell type biosensor," *Biosensors and Bioelectronics*, vol. 19, pp. 607-613 (2004).

Cheng, et al., "Increased Performance of Single-Chamber Microbial Fuel Cells Using an Improved Cathode Structure," Electrochemistry Communications, vol. 8, No. 3, pp. 489-494 (Mar. 2006).

Cheng, S. and Logan, B., "Sustainable and Efficient Biohydrogen Production via Electrohydrogenesis," PNAS, vol. 104, No. 47, pp. 18871-18873 (2007).

Clauwaert, et al., "Open Air Biocathode Enables Effective Electricity Generation with Microbial Fuel Cells," Environmental Science & Technology, vol. 41, No. 21, pp. 7564-7569 (Nov. 2007).

(56) References Cited

OTHER PUBLICATIONS

Cruz-Garcia, et al., "Respiratory nitrate ammonification by Shewanella oneidensis MR-1," *J Bacteriol*, vol. 189, No. 2, pp. 656-662 (Jan. 2007).

David, et al., "Nitrogen balance in and export from an agricultural watershed," *J Environ Qual.*, vol. 26, pp. 1038-1048 (1997).

Dichristina, T.J., "Effects of Nitrate and Nitrite on Dissimilatory Iron Reduction by Shewanella putrefaciens 200," J Bacteriol, vol. 174, No. 6, pp. 1891-1896 (1992).

Dinnes, et al., "Nitrogen Management Strategies to Reduce Nitrate Leaching in Tile-Drained Midwestern Soils," *Agronomy Journal*, vol. 94, pp. 153-171 (2002).

Faeth, P., "Fertile Ground: Nutrient Trading's Potential to Cost-Effectively Improve Water Quality," Washington, DC: World Resources Institute, 59 pgs. (2000).

Freguia, et al., "Electron and Carbon Balances in Microbial Fuel Cells Reveal Temporary Bacterial Storage Behavior During Electricity Generation," Environmental Science & Technology, vol. 41, No. 8, pp. 2915-2921 (Apr. 2007).

Gieling, et al., "ISE and Chemfet sensors in greenhouse cultivation," *Sensors and Actuators B*, vol. 105, pp. 74-80 (2005).

Gorby, et al., "Electrically conductive bacterial nanowires produced by Shewanella oneidensis strain MR-1 and other microorganisms." *Proceedings of the National Academy of Sciences*, vol. 103, No. 30, pp. 11358-11363 (2006).

Grommen, et al., "Removal of Nitrate in Aquaria by Means of Electrochemically Generated Hydrogen Gas as Electron Donor for Biological Denitrification," *Aquacultural Engineering*, vol. 34, No. 1, pp. 33-39 (2006).

Hallenbeck, P.C. and Benemann, J.R., "Biological hydrogen production; fundamentals and limiting processes." Int. J. Hydrogen Energy, vol. 27, pp. 1185-1193 (2002).

He, et al., "Electricity Generation from Artificial Wastewater Using an Upflow Microbial Fuel Cell," Environmental Science & Technology, vol. 39, No. 14, pp. 5262-5267 (Jul. 2005).

He, Zhen, and Angenent, L.T., "Application of Bacterial Biocathodes in Microbial Fuel Cells," Electroanalysis, vol. 18, No. 19-20, pp. 2009-2015 (Oct. 2006).

Holmes, et al., "Potential Role of a Novel Psychrotolerant Member of the Family Geobacteraceae, *Geopsychrobacter electrodiphilus* gen. nov., sp. nov., in Electricity Production by a Marine Sediment Fuel Cell," *Applied and Environmental Microbiology*, vol. 70, No. 10, pp. 6023-6030 (2004).

Jia, et al., "Simultaneous Organics Removal and Bio-Electrochemical Denitrification in Microbial Fuel Cells," *Bioprocess and Biosystems Engineering*, vol. 31, No. 4, pp. 315-321 (2008).

Kang, et al., "A microbial fuel cell with improved cathode reaction as a low biochemical oxygen demand sensor," *Biotechnology Letters*, vol. 25, pp. 1357-1361 (2003).

Kim, et al., "Membrane-electrode assembly enhances performance of a microbial fuel cell type biological oxygen demand sensor," *Environmental Technology*, vol. 30, No. 4, pp. 329-336 (Apr. 1, 2009).

Kim, et al., "Novel BOD (biological oxygen demand) sensor using mediator-less microbial fuel cell," *Biotechnology Letters*, vol. 25, pp. 541-545 (2003).

Kim, H., et al., "A Microbial Fuel Cell Type Lactate Biosensor Using a Metal-Reducing Bacterium, Shewanella putrefaciens," J. Microbiol. Biotechnol., vol. 9, No. 3, pp. 365-367 (1999).

Kostka, J.E. and Nealson, K.H., "Dissolution and reduction of magnetite by bacteria," *Environmental Science and Technology*, vol. 29, pp. 2535-2540 (1995).

Kumlanghan, et al., "Microbial fuel cell-based biosensor for fast analysis of biodegradable organic matter," *Biosensors and Bioelectronics*, vol. 22, pp. 2939-2944 (2007).

Lee, et al., "Fate of H 2 in an Upflow Single-Chamber Microbial Electrolysis Cell Using a Metal-Catalyst-Free Cathode," Environmental Science & Technology, vol. 43, No. 20, pp. 7971-7976 (Oct. 15, 2009).

Liu, et al., "Immobilised Activated Sludge Based Biosensor for Biochemical Oxygen Demand Measurement," *Biosensors and Bioelectronics*, vol. 14, No. 12, pp. 883-893 (2000).

Liu, et al., "Power Generation in Fed-Batch Microbial Fuel Cells as a Function of Ionic Strength, Temperature, and Reactor Configuration," Environ. Sci. Technol., vol. 39, No. 14, pp. 5488-5493 (2005).

Liu, et al., "Production of Electricity during Wastewater Treatment Using a Single Chamber Microbial Fuel Cell." Environmental Science & Technology, vol. 38, No. 7, pp. 2281-2285 (2004).

Liu, J. and Mattiasson, B., "Microbial BOD Sensors for Wastewater Analysis," *Water Research*, vol. 36, No. 15, pp. 3786-3802 (2002).

Logan, Bruce E, and Regan, John M., "Microbial Fuel Cells: Challenges and Applications." *Environmental Science & Technology*, vol. 40, No. 17, pp. 5172-5180 (Sep. 1, 2006).

Logan, et al., "Electricity generation from cysteine in a microbial fuel cell," Water Res., vol. 39, pp. 942-952 (2005).

Logan, et al., "Graphite Fiber Brush Anodes for Increased Power Production in Air-Cathode Microbial Fuel Cells," Environmental Science & Technology, vol. 41, No. 9, pp. 3341-3346 (May 2007).

Logan, et al., "Microbial Electrolysis Cells for High Yield Hydrogen Gas Production from Organic Matter," Environmental Science & Technology, vol. 42, No. 23, pp. 8630-8640 (Dec. 2008).

Min, et al., "Electricity Generation from Swine Wastewater Using Microbial Fuel Cells," Water Research, vol. 39, No. 20, pp. 4961-4968 (Dec. 2005).

Niessen, et al., "Gaining Electricity from in Situ Oxidation of Hydrogen Produced by Fermentative Cellulose Degradation," Letters in Applied Microbiology, vol. 41, No. 3, pp. 286-290 (Sep. 2005).

Oh, S., and Logan, B., "Hydrogen and Electricity Production from a Food Processing Wastewater Using Fermentation and Microbial Fuel Cell Technologies," Water Research, vol. 39, pp. 4673-4682 (2005).

Pham, et al., "Microbial Fuel Cells in Relation to Conventional Anaerobic Digestion Technology," Engineering in Life Sciences, vol. 6, No. 3, pp. 285-292 (2006).

Rabaey, et al., "Biofuel Cells Select for Microbial Consortia That Self-Mediate Electron Transfer," Applied and Environmental Microbiology, vol. 70, No. 9, pp. 5373-5382 (Sep. 2004).

Rabaey, et al., "Cathodic Oxygen Reduction Catalyzed by Bacteria in Microbial Fuel Cells," The ISME Journal, vol. 2, No. 5, pp. 519-527 (Feb. 2008).

Rabaey, et al., "Tubular Microbial Fuel Cells for Efficient Electricity Generation," Environmental Science and Technology, vol. 39, No. 20, pp. 8077-8082 (2005).

Rabaey, K. and Verstraete, W., "Microbial Fuel Cells: Novel Biotechnology for Energy Generation," Trends in Biotechnology, vol. 23, No. 6, pp. 291-298 (2005).

Ratako, et al., "Micro-and Mini-Nitrate Sensors for Monitoring of Soils, Groundwater and Aquatic Systems," *Center for Embedded Network Sensing*, 3 pgs. (May 12, 2009).

Rezaei, et al., "Substrate-enhanced microbial fuel cells for improved remote power generation from sediment-based systems," *Environ Sci. Technol.*, vol. 41, pp. 4053-4058 (2007).

Ringeisen, et al., "High Power Density from a Miniature Microbial Fuel Cell Using Shewanella oneidensis DSP10," *Environ. Sci. Technol.*, vol. 40, pp. 2629-2634 (2006).

Rozendal, et al., "Principle and Perspectives of Hydrogen Production through Biocatalyzed Electrolysis," International Journal of Hydrogen Energy, vol. 31, No. 12, pp. 1632-1640 (Sep. 2006).

Selembo, et al., "The Use of Stainless Steel and Nickel Alloys as Low-Cost Cathodes in Microbial Electrolysis Cells," Journal of Power Sources, vol. 190, No. 2, pp. 271-278 (May 2009).

Shantaram, et al., "Wireless sensors powered by microbial fuel cells," *Environ Sci Technol*, vol. 39, pp. 5037-5042 (2005).

Sukkasem, et al., "Effect of Nitrate on the Performance of Single Chamber Air Cathode Microbial Fuel Cells," Water Research, vol. 42, No. 19, pp. 4743-4750 (Dec. 2008).

Tabacova, et al., "Exposure to Oxidized Nitrogen: Lipid Peroxidation and Neonatal Health Risk," *Archives of Environmental Health: An International Journal*, vol. 53, No. 3 (1998), 9 pages.

(56) References Cited

OTHER PUBLICATIONS

Tabacova, et al., "Maternal Exposure to Exogenous Nitrogen Compounds and Complications of Pregnancy," *Archives of Environmental Health: An International Journal*, vol. 52, No. 5, (1997), 8 pages.

Van Ginkel, et al., "Biohydrogen gas production from food processing and domestic wastewaters," Int. J. Hydrogen Energy, vol. 30, pp. 1535-1542 (2005).

Van Rijn, J., "The Potential for Integrated Biological Treatment Systems in Recirculating Fish culture—A Review." Aquaculture, vol. 139, No. 3-4, pp. 181-201 (1996).

Virdis, et al., "Microbial Fuel Cells for Simultaneous Carbon and Nitrogen Removal," Water Research, vol. 42, No. 12, pp. 3013-3024 (2008).

Vitousek, et al., "Human Alteration of the Global Nitrogen Cycle: Sources and Consequences," *Ecological Applications*, vol. 7, No. 3 (1997), 15 pages.

Wagner, R. et al., "Hydrogen and methane production from swine wastewater using microbial electrolysis cells," Water Research vol. 43, pp. 1480-1488 (2009).

Whitmore, et al. "Hydrogen-Dependent Control of the Continuous Anaerobic Digestion Process". Appl. Microbiol. Biotechnol., vol. 26, pp. 383-388 (1987).

Wilson, et al., "The Effect of Temperature on the Performance and Stability of Thermophilic Anaerobic Digestion." Water Science & Technology, vol. 57, No. 2, pp. 239-246 (Jan. 2008).

Yokoyama, et al., "Treatment of Cow-Waste Slurry by a Microbial Fuel Cell and the Properties of the Treated Slurry as a Liquid Manure," Animal Science Journal, vol. 77, No. 6, pp. 634-638 (Dec. 2006).

Zhang, L. et al., "Electrochemical effect on denitrification in different microenvironments around anodes and cathodes," Research in Microbiology, vol. 156, pp. 88-92 (2005).

Zhang, Y., and Angelidaki, I., "Submersible microbial fuel cell sensor for monitoring microbial activity and BOD in groundwater: Focusing on impact of anodic biofilm on sensor applicability," *Biotechnology and Bioengineering*, vol. 108, No. 10 (2011), 34 pages.

Office Action issued by the State Intellectual Property Office of China for Chinese Patent Application No. 201280034071.2 dated Sep. 1, 2015 (18 pages).

Office Action issued by the Japan Patent Office for Japan Patent Application No. 2014-184927 mailed Sep. 15, 2015 (8 total pages).

\* cited by examiner

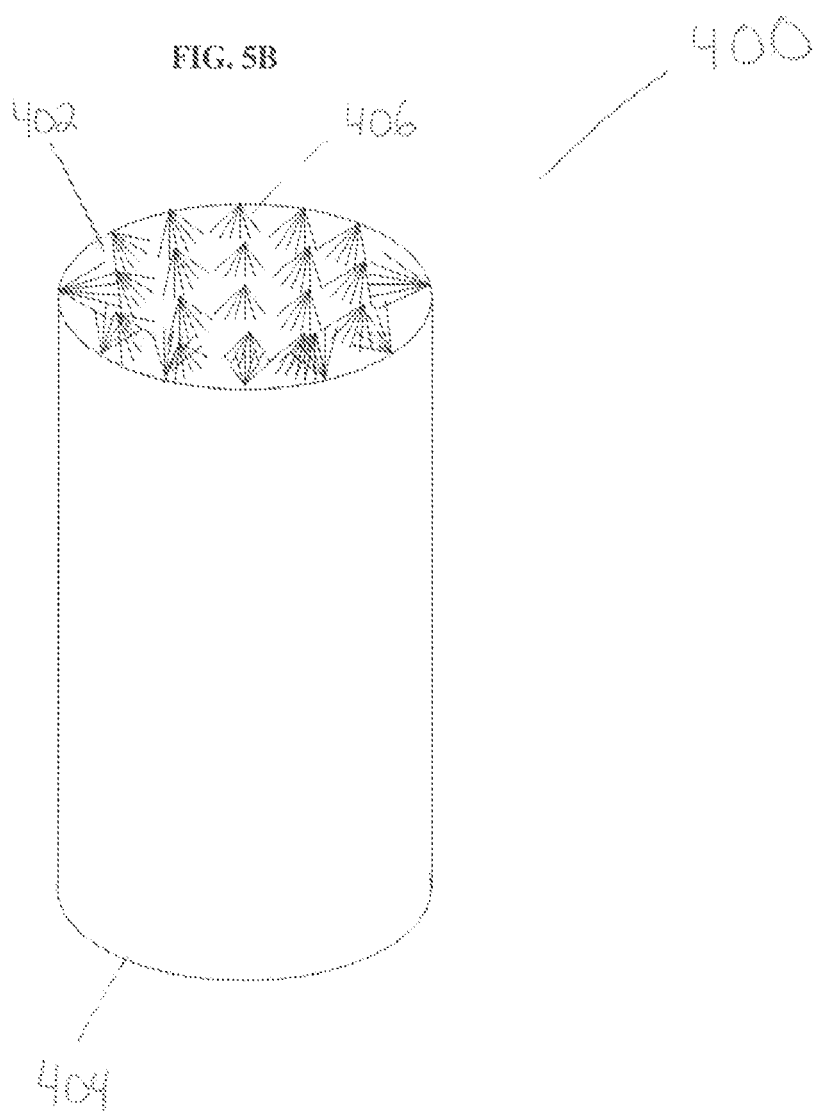

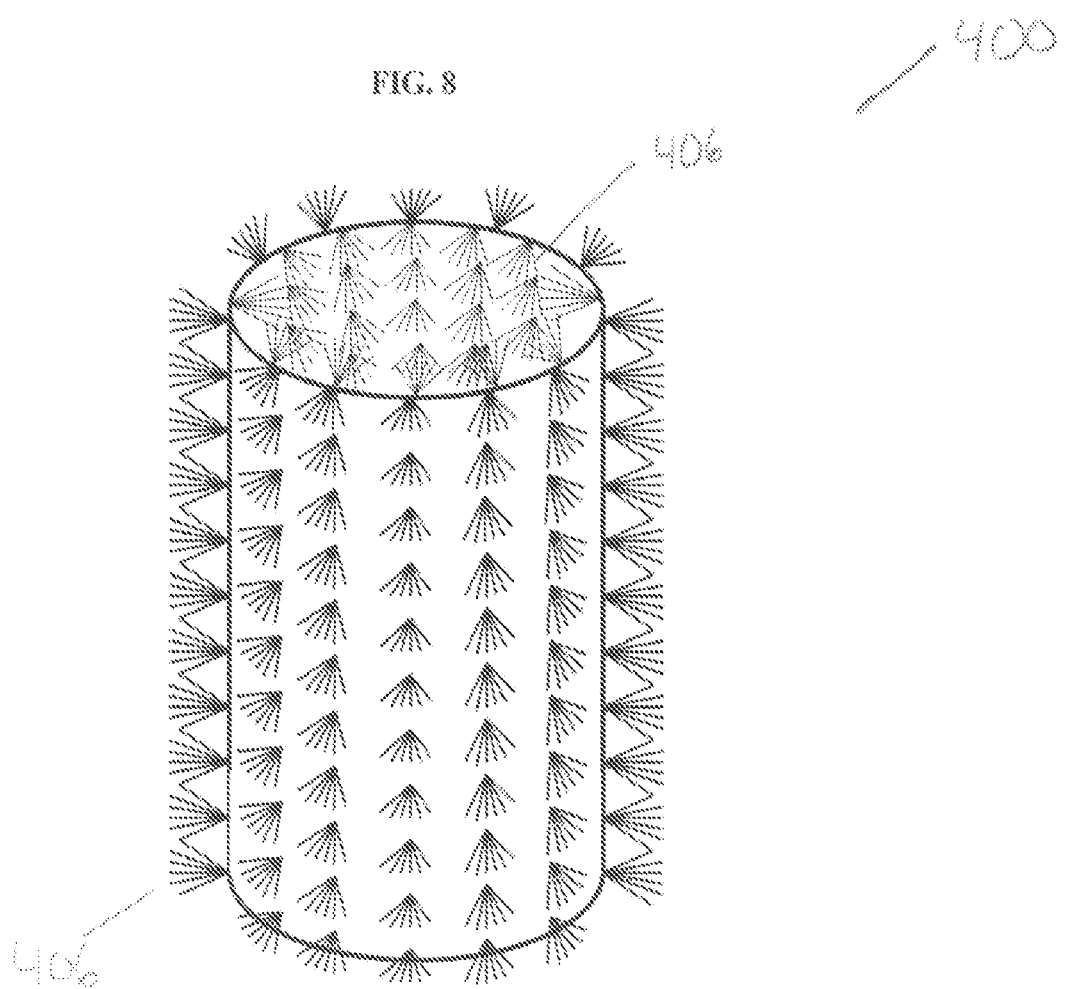

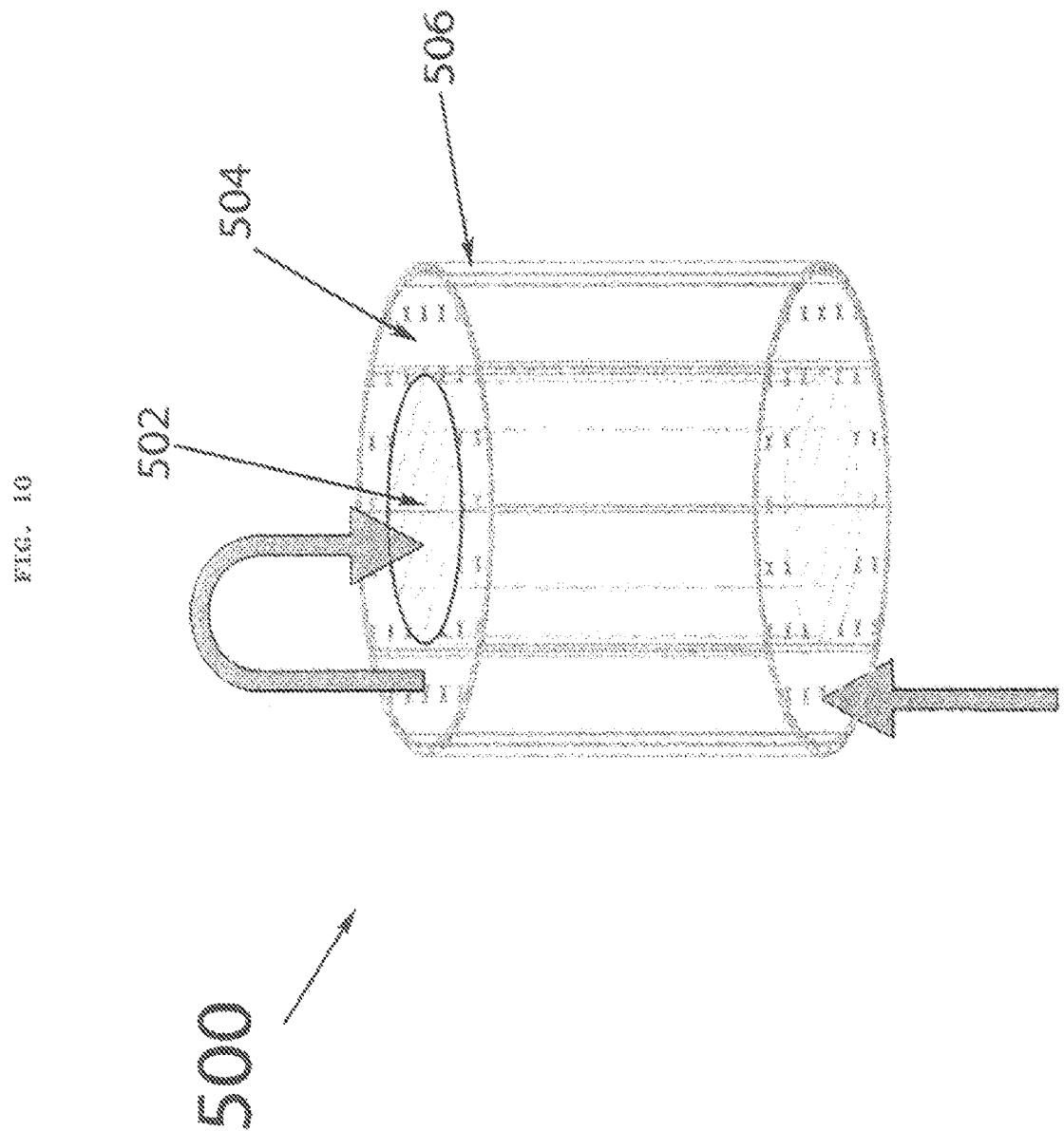

SYSTEMS AND DEVICES FOR TREATING WATER, WASTEWATER AND OTHER BIODEGRADABLE MATTER

CROSS-REFERENCE TO RELATED APPLICATIONS

This patent application is a national stage entry under 35 U.S.C. 371 of International Application No. PCT/US2010/025224, filed on Feb. 24, 2010, which claims the benefit of and priority to U.S. Provisional Application Ser. No. 61/187,469, filed on Jun. 16, 2009, U.S. Provisional Application Ser. No. 61/245,085 filed on Sep. 23, 2009, and U.S. Provisional Application Ser. No. 61/267,594 filed on Dec. 8, 2009. The entire contents of each of these applications are incorporated by reference herein.

TECHNICAL FIELD

The invention generally relates to systems and devices for treating and monitoring water, wastewater and other biodegradable matter, and generating value-added products from such matter.

BACKGROUND INFORMATION

The treatment and monitoring of water is a critical societal need. Approximately three percent (3%) of all electricity produced in the United States is consumed by wastewater treatment infrastructure. Of the electricity produced, approximately one and one-half percent (1.5%) is used in the actual treatment of wastewater. Some existing treatment paradigms include aerobic digestion and anaerobic digestion, however, these paradigms suffer from several drawbacks. For example, aerobic digestion is an energy intensive process and creates significant byproducts, such as biosolids. In addition, anaerobic digestion cannot treat water to levels low enough for environmental release. These drawbacks keep the cost of wastewater treatment high, which thereby affects a range of industries and municipalities. Thus, there is a critical need for cheaper and more energy efficient wastewater treatment technologies.

Bio-electrochemical systems (BES) are capable of generating electricity or other value-added products from the oxidation and reduction of organic matter. BES consist of electrodes, such as anode and cathodes, both or individually coated in bio-films with the ability to transfer or accept electrons from electrodes. Electrodes may also be coated in noble medals to catalyze one of the reactions taking place. The electrodes can then be separated by an electrolyte which conveys ions between them (generally a membrane).

Electrodes, bio-films, electrolytes, and catalysts may or may not be enclosed in a casing. Each of these elements, which include the casing, can be connected to external circuits, control systems, or other reactors for use in combined systems. The geometrical configuration of the elements in a microbial fuel cell and their material definition can together be defined as the "architecture" of the system.

Over the years, a number of different BES architectures and components have been developed and tested for different uses. Two major categories of architectures are those that operate in batch mode versus flow-through (or plug flow) mode. In a batch-mode system, an oxidant is placed in a reactor in batches and is treated until some endpoint is reached before the next batch is treated. In flow-through mode, a continuous flow of material to be treated is provided into a reactor with a concurrent flow out of the reactor for a constant volume to be retained inside.

Flow through reactors include side-ways flow or upward flow, such as the upflow microbial fuel cell (UMFC) In a UMFC, an organic-laden medium is percolated upwards through a porous anode material (i.e. graphite granules). A number of electrode designs have also been used in UMFC designs. Original UMFC designs used in laboratory tests were not scalable due to the use of flat electrode surfaces, which provided low surface areas per volume of reactor. Therefore, high surface area materials were developed, called a "brush anode", consisting of small-diameter graphite fibers linked to a central core (generally a non-corrosive metal such as titanium) that provides both high conductivity as well as resistance to fouling. Brush anodes have been made of carbon fibers (e.g. PANEX®33 160K) and cut to a set length and wound using an industrial brush manufacturing system into a twisted core consisting of two titanium wires. When placed in a reactor, the total surface area of typical brush electrodes per volume of reactor has been estimated to be as high as 9600 m2/m3. Reactors using these brushes have produced up to 2400 mW/m2 in a cube reactor with a defined acetate medium. However, these electrodes are expensive due to the materials used. In addition, the form itself, a wrapped brush, requires several steps to manufacture.

Therefore, a need exists to address the aforementioned drawbacks of the prior art.

SUMMARY OF THE INVENTION

In one aspect, the invention relates to a bio-electrochemical system for the generation of methane from organic material. The system is comprised of a reactor that includes an anode, a cathode, a methanogenic microbe, and a power source configured to apply voltage to the anode and the cathode. The anode and the cathode are substantially in proximity within the reactor.

In one embodiment according to this aspect of the invention, the voltage facilitates exocellular electron transfer from the anode to the cathode. In another embodiment according to this aspect of the invention, the system is further comprised of a plurality of methanogenic microbes. In another embodiment according to this aspect of the invention, the voltage facilitates exocellular electron transfer to methanogenic microbes to initiate a reduction of hydrogen-2 oxidation. In yet another embodiment according to this aspect of the invention, methane is generated and organic materials are oxidized at either or each of the anode and cathode. The generation of methane and the oxidation of organic materials serve as the purpose of controlling elements within the reactor. The controlling elements include any one or more of the following: the measure of pH, biochemical oxygen demand, chemical oxygen demand, ammonia, and other chemical species. In another embodiment according to this aspect of the invention, the reactor is an existing anaerobic digestion system used for wastewater and solids treatment. The anode and the cathode are placed within the anaerobic digestion system for the purpose of enhancing methane production or controlling elements of an anaerobic digestion process.

In another embodiment according to this aspect of the invention, the power source is electricity generated by a generator or a fuel cell powered by methane generated in the reactor. In yet another embodiment according to this aspect of the invention, a flow is created within the system to move material from the anode to the cathode to increase the rate of methane production.

In a second aspect, the invention relates to a bio-electrochemical system for reducing chemical oxygen demand and nitrogenous waste through denitrification. The system is comprised of a first chamber, a second chamber, a methanogenic microbe, and a filter disposed between the first chamber and the second chamber. The first chamber includes an anode and the second chamber includes a cathode. The filter is configured to facilitate nitrification produced therein.

In one embodiment according to this aspect of the invention, the first chamber includes a first wall and a second wall defining an enclosed space such that the anode facilitates the oxidization of the microbe. In another embodiment according to this aspect of the invention, the second chamber includes a first wall and a second wall defining an enclosed space such that the cathode is configured to facilitate the reduction of nitrates, oxygen or other oxidized species.

In yet another embodiment according to this aspect of the invention, the first chamber has a substantially tubular configuration. In another embodiment according to this aspect of the invention, the system further comprises a membrane for separating the first chamber and the second chamber. In another embodiment according to this aspect of the invention, the first chamber is disposed within a first membrane and the second chamber is disposed around the first membrane and enclosed by a tube member. In yet another embodiment according this aspect of the invention, the filter is a trickling filter that is placed above the anode to facilitate flow through the anode and over the trickling filter.

In a third aspect, the invention relates to an electrode for use in a bio-electrochemical system. The system includes a first surface and a second surface. The first surface is comprised of a substantially conductive material. The conductive material is woven to the second surface.

In one embodiment according to this aspect of the invention, a membrane is disposed between the first surface and the second surface. In another embodiment according to this aspect of the invention, the conductive material is woven to the second surface using carpet-manufacturing techniques and technologies. In yet another embodiment according to this aspect of the invention, the conductive material is carbon fiber. In another embodiment according to this aspect of the invention, the first surface has a substantially tubular configuration. In another embodiment according to this aspect of the invention, the second surface has a substantially tubular configuration. In yet another embodiment according to this aspect of the invention, the electrode further comprises a plurality of first and second surfaces. In yet another embodiment according to this aspect of the invention, the electrode further comprises a plurality of membranes.

In a fourth aspect, the invention relates to a system for the adaptive control of a bio-electrochemical system. The system includes a probe configured to measure stimulus emitted to a fuel cell, and a control tool for monitoring levels of the fuel cell. The control tool is also configured to optimize the levels of the fuel cell.

In one embodiment according to this aspect of the invention, the control tool monitors a plurality of chambers within the fuel cell. In another embodiment according to this aspect of the invention, the stimulus includes any one or more of the following: voltage, current, pH, temperature, internal resistance, activation voltage loses, concentration voltage loses, fuel concentration, ammonia levels, nitrate levels, oxygen levels, and oxygen levels. In another embodiment according to this aspect of the invention, the levels include any one or more of the following: voltage, resistance, electrode spacing, fuel loading rate, and pH of fuel.

In a fifth aspect, the invention relates to a fuel cell. The fuel cell is comprised of a first compartment including a cascading anode, a second compartment including a cascading cathode, and a plurality of inputs and outputs within each of the first chamber and the second chamber.

In one embodiment according to this aspect of the invention, the fuel cell includes a substantially tubular configuration in which methanogenic or electrogenic microbes are disposed therein. In another embodiment according to this aspect of the invention, the first compartment is disposed within the second compartment. In yet another embodiment according to this aspect of the invention, the first and second compartments are disposed within a third compartment including an air-cathode.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

FIG. 5B is a plan view of an embodiment of a fuel cell for use in a bio-electrochemical system, in accordance with the present disclosure.

FIG. 8 is a plan view of an embodiment of a fuel cell for use in a bio-electrochemical system, in accordance with the present disclosure.

FIG. 10 is a plan view of a fuel cell for use in a bio-electrochemical system, in accordance with the present disclosure.

DESCRIPTION

Figure 1:
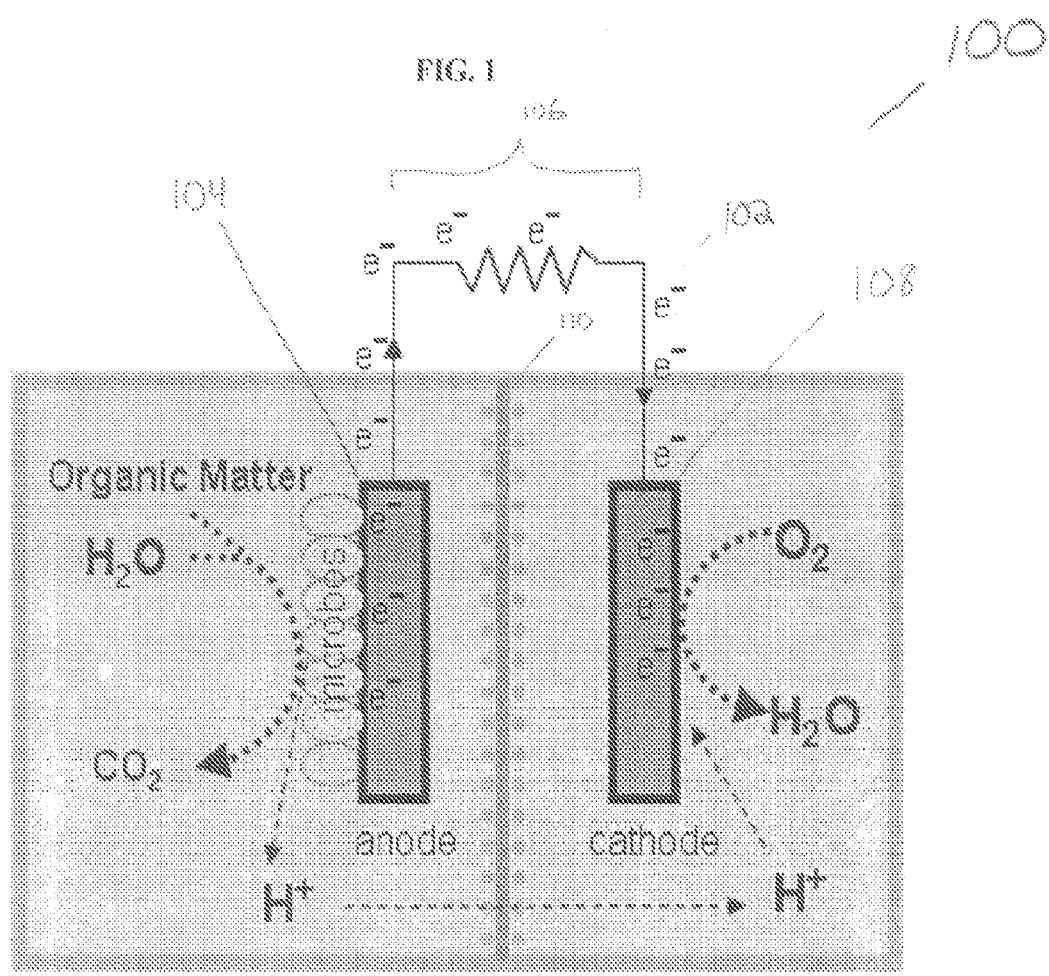
FIG. 1 is a plan view of a bio-electrochemical system, in accordance with the present disclosure.

Different bio-electrochemical system configurations have been devised to create a number of value-added end products. Two of the most important are electricity and hydrogen gas. Referring to FIG. 1, in a bio-electrochemical system 100, electrical current can be created by harvesting electrons 102 liberated during microbial breakdown of organic wastes at an anode 104 while allowing the electrons 102 to flow through a circuit 106 to a cathode 108 exposed to a terminal electron acceptor, usually oxygen. Hydrogen can be generated by purposely applying a voltage to the system 100 while using water as the cathode electron acceptor, which enables hydrogen evolution at the cathode.

In almost all instantiations of microbial fuel cells, the architecture has been such that the anodic and cathodic compartments are separated by a barrier 110. Often the barrier 110 is an electrically conductive membrane that can selectively allow ions to pass through it. Conversely, the fluid in the system 100 can be used as the electrolyte in a membraneless configuration. However, in this latter instantiation, an electron acceptor must be provided, and therefore a region is created where the cathode 108 can either be exposed to the air, or pass the fuel/electrolyte over the barrier 110 where it can then come in contact with the cathodic 108 while also exposing it to the air or some electron acceptor.

For example, in all configurations in which hydrogen is created, the cathode 108 is assumed to be co-exposed to a different compartment than the anode 104 for the hydrogen gas to be evolved. Similarly, in another configuration, the electrolyte is passed through a loop into the cathode 108, before which it can optionally undergo exposure to oxygen in the air.

Figure 2:
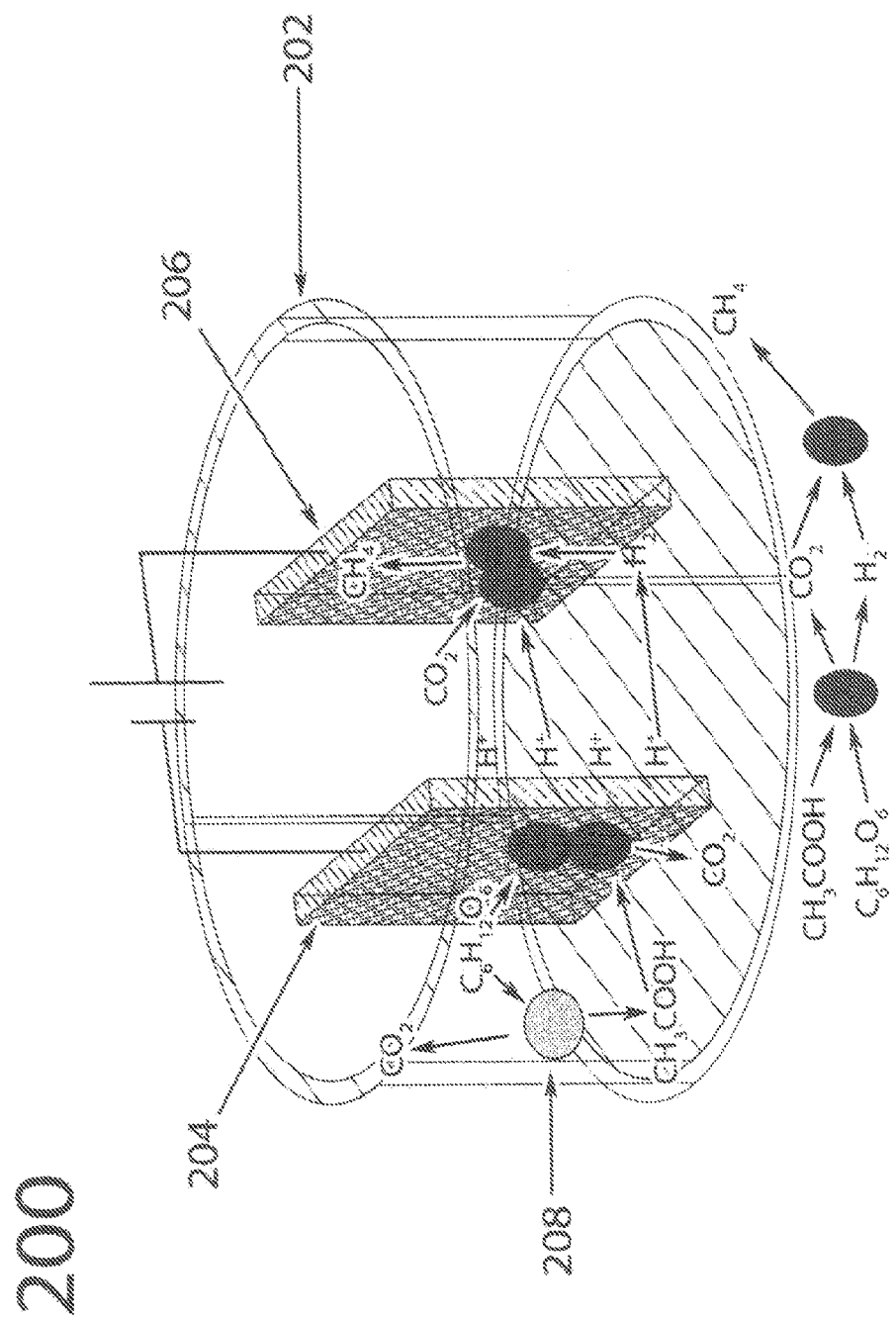
FIG. 2 is a plan view of an embodiment of a bio-electrochemical system, in accordance with the present disclosure.

Referring to FIG. 2, a bio-electrochemical system 200 for the generation of methane from organic material is presented. The system 200 is comprised of a reactor 202 that includes an anode 204, a cathode 206, and a methanogenic microbe 208. The anode 204 and the cathode 206 are substantial in close proximity to one another within the system 200. The system is further comprised of a power source (not shown in Figure) that is configured to apply voltage to the anode 204 and the cathode 206. The voltage facilitates exocellular electron transfer from the anode 204 to the cathode 206. In addition, the voltage facilitates the reduction of hydrogen-2 oxidation.

In one embodiment, the methanogenic microbe 208 is biodegraded into three principal groups within the system 200. For example, the microbe 208 may be primary fermentors, secondary fermentors, and hydrogenotrophic methanogens. Each of the microbes 208 may occur independently of the anode 204 and the cathode 206 in the system 200, however, the incorporation of the anode 204 and the cathode 206 provides an additional mechanism for hydrogen production and/or electron transport within the system 200. This mechanism provides an enhanced rate of treatment and/or alteration of the composition of the microbe 208.

Methanogenic metabolism from carbon-containing wastes, referred to as anaerobic digestion (AD) due to its requirement of anoxic conditions, is a widely-used organic wastewater remediation technology. Its significant benefits over aerobic waste treatment include the production of methane rich gas (called biogas), lower sludge production, and lower operating costs. These benefits have led to its application to diverse organic waste streams, such as municipal wastewater, agricultural and food processing waste, and chemical industry waste.

Microbe-mediated methane production from complex organic waste streams is a multi-stage process. In the first stage, the acid-former group (acetogens), which contains many sub-niches, includes species that digest polysaccharides, sugars, fatty acids, alcohols and more complex molecules in the waste into organic acids, primarily acetate, but also others like lactate and butyrate. The second class is the methane-formers, or methanogens, which consist of two sub-niches. Some methanogens metabolize acetate directly and produce methane as a byproduct (aceticlastic methanogenesis), while the other methanogens use Hydrogen-2 ($H_2$) and Carbon Dioxide ($CO_2$) as energy sources to produce methane (hydrogenotrophic methanogenesis).

Hydrogenotrophic methanogenesis (HM) is a favorable process within the reactor 202 because of the consumption, rather than production, of $CO_2$ during methane production, which results in a purer biogas with a higher proportion of methane and a lower proportion of $CO_2$. While $CO_2$ and acetate are generally abundant byproducts of upstream (acetogenic) metabolic processes, $H_2$ is a minor byproduct that may quickly become limiting and therefore, aceticlastic methanogenesis (AM) can be used instead of HM under normal anaerobic digestion operation conditions. Additionally, hydrogenotrophic methanogens are more resistant to high temperatures (thermophilic conditions) above 50° C. Referring to Table 1 below, the HM has a lower Gibbs free energy change than the AM reaction and is therefore thermodynamically favored.

TABLE 1

Routes of methanogenesis.

| Reaction | Equation | Free Energy Change $\Delta G°$ (kJ/reaction) |
| --- | --- | --- |
| Hydrogenotrophic methanogenesis | $4H_2 + CO_2 \rightarrow CH_4 + 2H_2O$ | −130.7 |
| Aceticlastic methanogenesis | $CH_3COO^- + H^+ \rightarrow CH_4 + CO_2$ | −31.0 |

The system 200 addresses hydrogen limitation in the HM reaction by including within the reactor 202 an electrode, or set of electrodes, such as the anode 204 and the cathode 206, that deliver a voltage to increase the favorability of $H_2$ formation. In one embodiment, the anode 204 and the cathode 206 directly donate electrons to hydrogenotrophic methanogens to reduce or eliminate the need for $H_2$ oxidation. Because the production of hydrogen in the system 200 occurs at the surface of the anode 204 and cathode 206 where methanogenic organism biofilms are present, the production occurs in a scale and location that is more easily available to methanogenic microbes 208 than it would be if the simple mixing of hydrogen gas took place within the reactor 202. Further, the hydrogen production and rapid co-consumption within the system 200 is inherently much safer than the use of bulk hydrogen gas.

In one embodiment, a microbial electrolysis cell is added within the system 200 such that the $H_2$ evolved at the cathode 206 is produced where methanogenic microbes 208 can immediately utilize it for methane production. This is achieved by the addition of sufficient electrical voltage such that that the cathode 206 potential is negative to allow $H_2$ formation as a terminal electron acceptor for microbial metabolism. The $H_2$ that is produced is then utilized by hydrogenotrophic methanogens to produce methane gas more efficiently.

In another embodiment, an electrode, such as the anode 204 or cathode 206, supplying electrons to methanogens microbes 208 is contained in a chamber (not shown in Figure), where the cathode 206 potential is provided such that electrons transferred to methanogens microbes 208 are at a correct energy to allow methane production without the need for hydrogen. In this embodiment, the reactor 202 may be configured as a two chamber reactor, with primary fermentation to produce acetate in the first chamber, and secondary fermentation as well as methanogenesis confined to the second chamber.

In yet another embodiment, hydrogenotrophic methanogenesis is enhanced through the production of $H_2$ by secondary fermentative organisms accepting electrons from the cathode 206. Additionally, the methanogens microbes 208 undergo direct electron acceptance from the cathode 206 to increase the rate of methane production.

The system 200 may be applied to any anaerobic digestion systems in order to improve the efficiency, rate of treatment, composition or purity of biogas produced, or effective wastewater biochemical oxygen demand (BOD) content range. The system 200 can be applied to a wide range of wastewaters and organic matter streams, including, but not limited to, animal manures or manure slurries; non-manure agricultural wastes; slaughterhouse waste or wastewater; food processing wastewater or slurries; beverage processing wastewaters, including brewery wastewater or slurries; municipal wastewater; and septic system wastewater or grey-water building wastewater. The system 200 can also be applied to existing technology through a retrofit installation, either as a custom fabricated system or the application of one or more modular electrode enhancement units. Electrode enhancement may also be applied to newly constructed AD systems as a retrofit system or as an integral system component.

Figure 3:
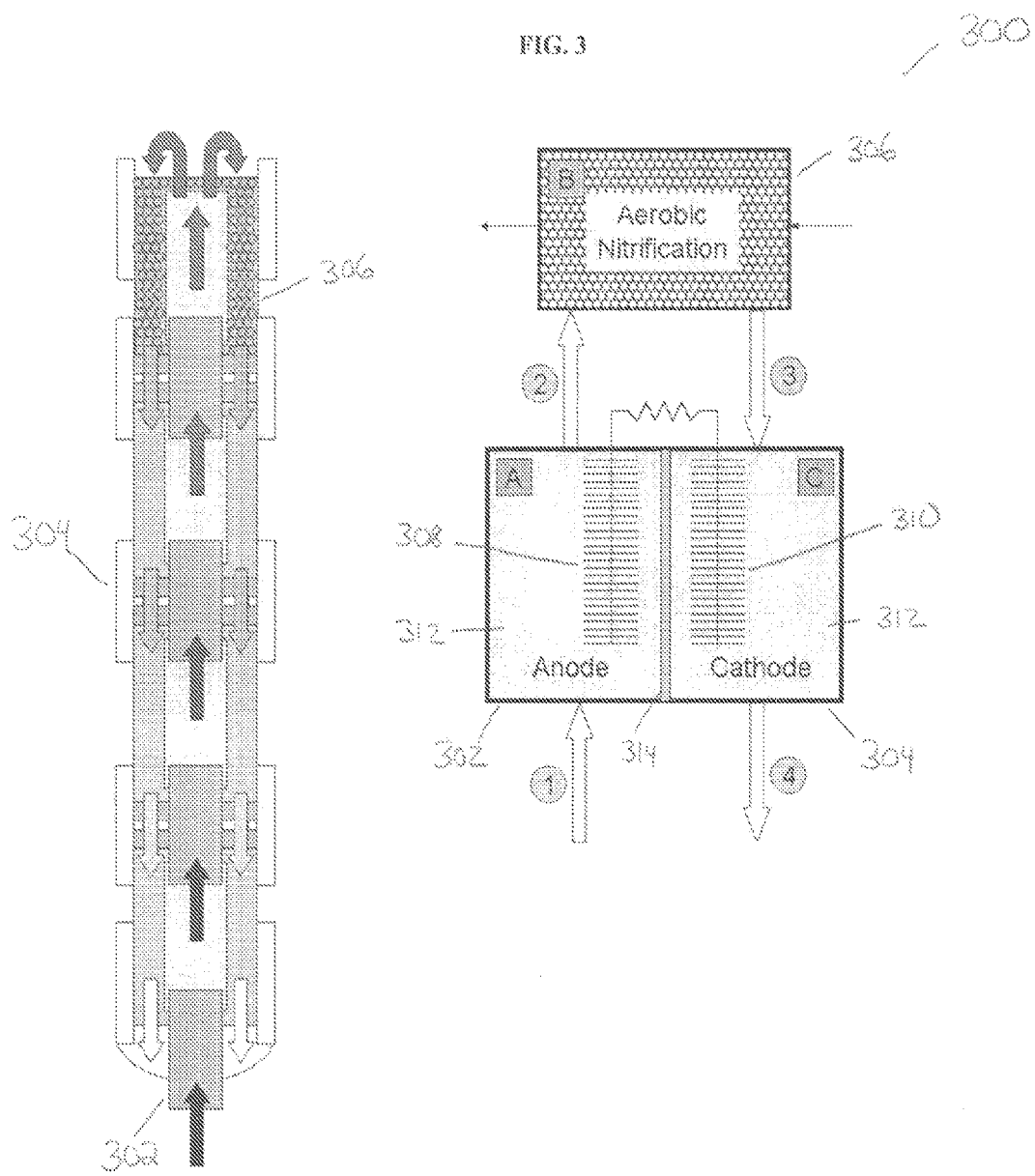
FIG. 3 is a plan view of another embodiment of a bio-electrochemical system, in accordance with the present disclosure.
Figure 4A:
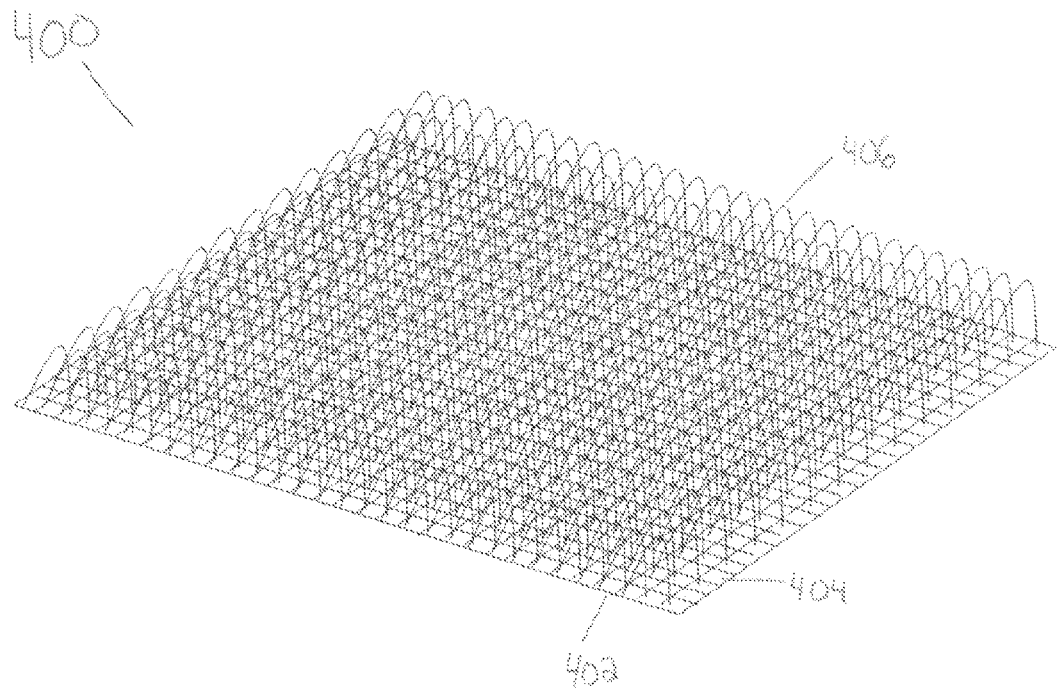
FIG. 4A is a perspective view of a fuel cell for use in a bio-electrochemical system, in accordance with the present disclosure.
Figure 4B:
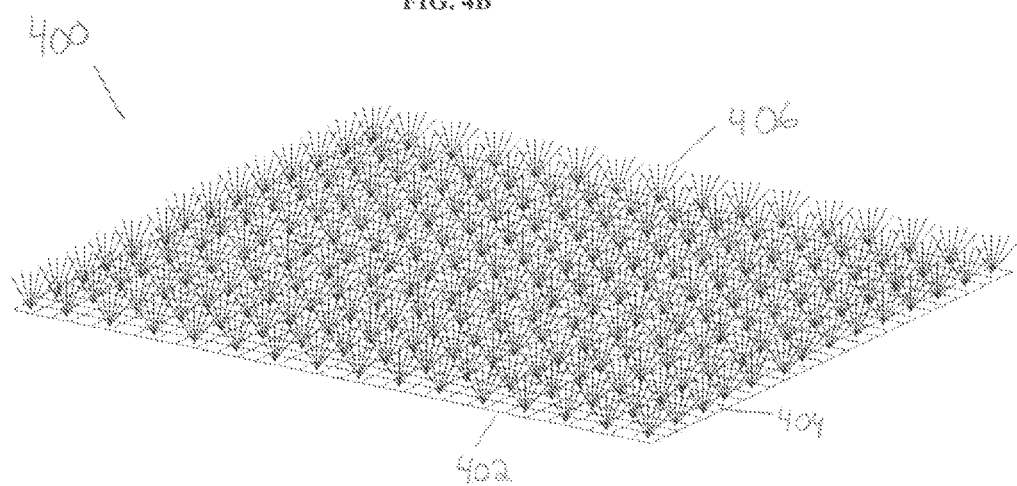
FIG. 4B is a perspective view of an embodiment of a fuel cell for use in a bio-electrochemical system, in accordance with the present disclosure.

Referring to FIG. 3, a bio-electrochemical system 300 for reducing chemical oxygen demand and nitrogenous waste through denitrification is presented. The system 300 includes a first chamber 302, a second chamber 304, and a filter 306 disposed between the first chamber 302 and the second chamber 304. The filter 306 is configured to facilitate nitrification therein. The first chamber 302 includes an anode 308. The second chamber includes a cathode 310. Methanogenic microbes 312 are disposed within the first chamber 302 and the second chamber 304. The first chamber 302 is configured to facilitate the oxidization of the microbes 312 therein. In addition, the second chamber 304 is configured to facilitate the reduction of nitrite therein. Each of the first chamber 302 and the second chamber 304 may be separated by a membrane 314.

In one embodiment, the system 300 is comprised of four parts: 1) the first chamber 302 for microbial BOD oxidation; 2) the trickling filter 306 for nitrification of ammonia and nitrite; 3) The second chamber 304 for microbial reduction of nitrate to $N_2$; and 4) the semi-permeable membrane 314 that separates the first chamber 302 and the second chamber 304 topologically, but retains them in electronic and ionic communication. The system 300 is used to treat wastewater traveling in one direction through the reactor, in either a continuous or intermittent stream.

The first component of the system is the first chamber 302 that contains an electrode or series of electrodes that serve as the attachment point for one or more species of microbes 312. The microbes 312 on these electrodes affect the oxidation of carbon based wastes to reduce the biological oxygen demand (BOD) content of the waste and the transfer of liberated electrons to the anode. There may be one or more first chambers that are arranged in series or in parallel configuration.

The second component of the system is the aerobic trickling filter 306 that is filled with air or other oxygen-containing gas, and contains non-conductive, high-surface area substrate over which wastewater exiting the first chamber 302 can be trickled. Trickling allows rapid re-oxygenation of wastewater for oxidation of ammonia and nitrite to nitrite, also referred to as nitrification. This filter 306 may or may not include a control system for dynamic monitoring of oxygen concentration and for adjustment of oxygen concentration to within an optimal range. In addition, the filter 306 may or may not contain an oxygen-removing device where the wastewater exits the system and enters the third compartment.

The third component of the system is the second chamber 304 that contains an electrode or series of electrodes that serve as the attachment point for one or more species of microbes 312. The microbes 312 on these electrodes affect the acceptance of electrons and the reduction of nitrate in the wastewater to $N_2$ gas which will diffuse out of the liquid upon exit of water from the system 300. There may be one or more second chambers 304 that are arranged in series or in parallel configuration.

The fourth component of the system is the membrane 314 that topologically separates the first chamber 302 and the second chamber 304. The membrane 314 is permeable to protons and small positive ions, but is impermeable to negative ions and uncharged particles. The membrane 314 serves to keep the first chamber 302 and the second chamber 304 in electrical communication in order to complete the circuit, but does not allow the passage of wastewater components to bypass the system 300.

It is contemplated that the balancing of a number of facets is useful to effect optimal performance of the system 300. These facets include: (1) the ratio of the first chamber 302 to the second chamber 304 volume and number of chambers either arranged in parallel or in series; the ratio of the anode 308 to the cathode 310 electrode surface areas; the flow rate of wastewater through the system 300, as well as continuous vs. intermittent waste flow; the concentration of oxygen and composition of gas within the trickling filter 306, as well as dynamic addition of oxygen to the filter 306; the volume ratios of the first chamber 302 to the trickling filter 306 and the second chamber 312 to the trickling filter 306; and the use of computer-controlled system for dynamic monitoring and adjustment of flow rate, oxygen concentration or oxygen addition to the system 300.

In one embodiment, the system 300 can be used to treat wastes that are carbon:nitrogen imbalanced and therefore require carbon, or possibly nitrogen, additions for efficient remediation by other technologies. These wastes include aquaculture wastes, mariculture wastes, agricultural wastes, food processing and beverage processing wastewaters, and other wastes that are carbon:nitrogen-unbalanced. The system 300 may be used on either recirculating or flow through aquaculture operations.

In another embodiment, microbe 312 co-removal of organic and nitrogen-containing wastes within the system 300 requires carbon to nitrogen ratios of 10:1 to 20:1 to proceed efficiently. Many wastes that are nitrogen-rich do not readily lend themselves to co-treatment. Aquaculture wastes are an important example of this type of unbalanced waste, and their balanced treatment is made more imperative by the effects of ammonia, nitrite and nitrate toxicity on cultured animals. Ammonia and nitrite are toxic at levels well below 1 mg/L, but are readily treated through an aerobic bacterial nitrification process. However, while nitrate levels of 1000 mg/L are tolerable for many species, it is generally advised to keep nitrates below 1000 mg/L in freshwater or 1500 uM (about 93 mg/L) in seawater, as they are detrimental to marine invertebrates in closed systems. The resulting decrease in fish growth rate can cost an aquaculture facility up to several millions of dollars per year.

Where nitrate levels are unacceptably high, water can be denitrified by water exchange or by anaerobic bacteria in a separate treatment system. Anaerobic de-nitrification uses heterotrophic bacteria such as Pseudomonas and an additional carbon source such as methanol to reduce nitrate to nitrite and eventually to nitrogen gas. This method is effective but requires carbon source input and frequent chemical balance monitoring for efficient nitrate removal. Organic matter (e.g. sludge) from the same facility can be used in the place of methanol. However, because the sludge is often in particulate form, hydrolysis and fermentation must be applied to convert the sludge into volatile fatty acids and other molecules more easily consumed by denitrifying organisms, adding complexity and cost to the operation.

Alternatively, the facility can use electrochemically generated hydrogen gas as electron donor to drive biological de-nitrification. This requires constant input of hydrogen gas bought externally or created locally using energy-intensive electrolysis. Another proven approach involves the use of plants in artificial wetlands or hydroponic systems to remove excessive nitrate. The latter adds complexity to the aquaculture system and is not widely used. For these reasons, many farms to date have ignored the affects of nitrates in order to save money on treatment, or used water exchange as the principal form of de-nitrification.

A number of benefits make the system 300 particularly compelling for treatment of carbon:nitrogen-unbalanced wastes, such as aquaculture wastes. First, a preliminary study suggested that a combined BOD/de-nitrification reactor run together with a nitrification step. This achieved increased removal yields of 2 kg COD/m3 day, 0.41 kg NO3-N/m3 day, with a current generation of 34.6 W/m3, all normalized to the net cathodic compartment, and equally important, they achieved a COD/N ratio of approximately 4.5 g COD/g N. Since, anodic BOD reduction may occur at a fraction of sludge production versus aerobic treatment processes, thereby reducing overall treatment costs significantly. Therefore, each of the first compartment 302 and the second compartment 304 creates an environment with intensive competition for nutrients and substrate attachment sites. These conditions allow probiotic (beneficial) microbes 312, which are more suited to such environments, to survive while fostering a significant reduction in pathogen levels and improvements in fish health within the system 300.

A number of factors may suggest that BOD removal can be achieved using carbon:nitrogen-unbalanced wastes, such as aquaculture wastes at the anode 302. First, as described above, necessary bacteria are already present in wastes. For example, one study showed a reduction of up to eighty-four percent (84%) of the BOD from cow manure slurry, while another study consistently achieved BOD reduction of eighty-percent (80%) using domestic wastewater. Further, another study demonstrated that swine waste could produce electricity in a microbial fuel cell system (MFC) at power densities consistent with other potential substrates using air-cathode MFC systems. These systems measured a maximum power density of 261 mW/m2 while reducing soluble chemical oxygen demand (COD) by 88%-92% percent and ammonia by 83%. Additionally, a number of electrogenic bacteria isolated from freshwater and marine sediments, demonstrating that these species thrive in aquaculture system conditions.

BOD reduction within system 300 is accomplished with significantly less excess biomass production compared to equivalent aerobic processes. Under aerobic conditions, the consumption of 1 g of organic substrate produces around 0.4 g of biomass; in an MFC the same amount of BOD reduction proceeds with 50-80% less biomass production observed. One study documented even lower biomass yields in an MFC process under certain conditions. Given that sludge treatment at a municipal waste treatment facility can cost $1,000 per ton of dry waste, this could amount to a substantial reduction in cost and a more favorable cost balance for the BEC process.

Many early studies of BEC processes focused on anodic processes, using traditional platinum-coated, open-air cathodes. One study noted bio-cathodic oxygen reduction in open-sea systems. Another study demonstrated high current production using an acetate-fed fuel cell with a graphite felt open-air biological cathode 83±11 W m−3 MFC (0.183 L MFC) for batch-fed systems (20-40% coulombic yield) and 65±5 W/m−3 MFC for a continuous system with an acetate loading rate of 1.5 kg COD m−3 day-1 90±3% coulombic yield). These study found that by adding manganese to air-cathode, power output increased substantially. Other studies confirmed cathodic bacteria's role as a true oxygen catalyst.

Biological cathodes reduced electrode cost by avoiding previous metal catalysts. Perhaps as importantly for water treatment applications, biological reduction can be harnessed to perform additional treatment steps. De-nitrification is a prime target because the reduction potential on the order of that of oxygen ($NO_3^-/N_2$ at +0.74V versus +0.82V for $O_2/H_2O$). One study was able to demonstrate increased denitrification in the presence of biological cathodes (55.1% increase at 100-200 mV and current of 40 mA), though this was accomplished using poised potentials rather than full MFC processes. More recently, combined BOD/de-nitrification was demonstrated in complete microbial fuel cell systems operating with biological cathodes.

Another proposed study recently demonstrated a combined BOD/de-nitrification reactor running together with a nitrification step. This study achieved increased removal yields of 2 kg COD/m3 day, 0.41 kg NO3-N/m3 day, with a current generation of 34.6 W/m3 all normalized to the net cathodic compartment. Equally important, the study achieved a COD/N ratio of approximately 4.5 g COD/g N, as compared to the typical requirement ratio of 7, a value which virtually eliminates the need for carbon addition in wastewater treatment. The system 300 combines the concept of looping nitrification together with other advances made in the field to achieve an economically superior combined carbon-nitrogen treatment.

In one embodiment, the system 300 is a two-chamber system (the first chamber 302 and the second chamber 304), where the anode 308 and the cathode 312 are separated into two chambers by the membrane 314 that allows ion exchange. In another embodiment, the system 300 is a single chamber system using air at the cathode 312, which can utilize either a chemical catalyst or a biologically-catalyzed cathode.

Both single and two-chamber systems can be operated in batch or flow-through mode. A variation on the flow-through MFC, called an upflow MFC (UMFC), addresses transport limitations and it has been shown to operate with lowered internal resistance than a conventional MFC. In the UMFC, organic-laden medium 312 is percolated upwards through a porous anode 312 material (i.e. graphite granules). In one study, the MFC was partitioned with a proton exchange membrane, placing an air-exposed cathodic chamber above the anode 308. In this study, defined sucrose medium was used to test the UMFC. High SCOD removal rates were observed (up to 97%) even at relatively high loading rates over 3 g COD/L/day, though a majority of this could be attributed to methanogenesis rather than electron transport. A second study undertaken with another UMFC design showed that a lower internal resistance increased volumetric power production to a maximum of 27 W/m3. More recently, a pilot scale upflow MFC was developed and demonstrated by running on brewery effluent.

Figure 5A:
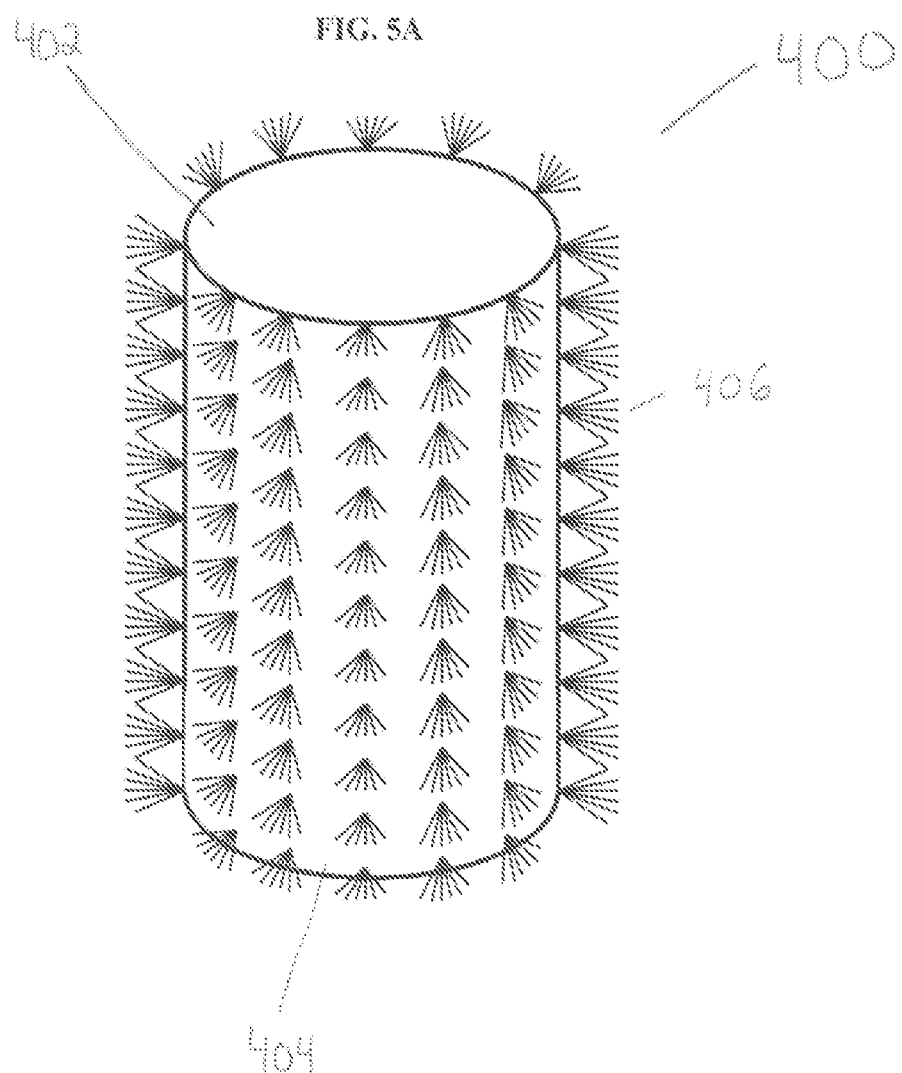
FIG. 5A is a plan view of an embodiment of a fuel cell for use in a bio-electrochemical system, in accordance with the present disclosure.
Figure 6:
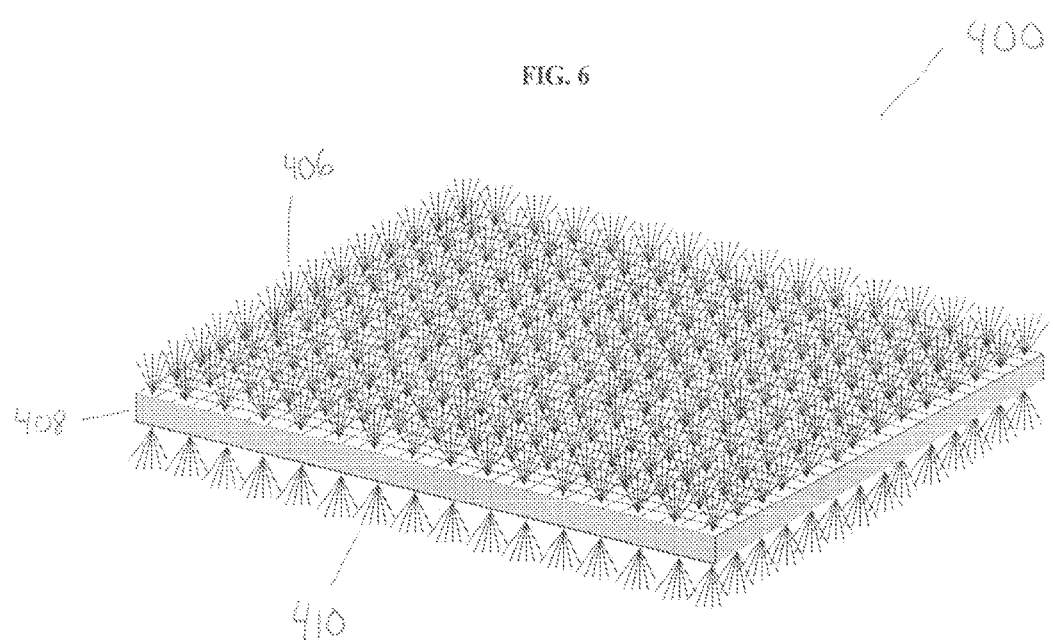
FIG. 6 is a perspective view of an embodiment of a fuel cell for use in a bio-electrochemical system, in accordance with the present disclosure.
Figure 7:
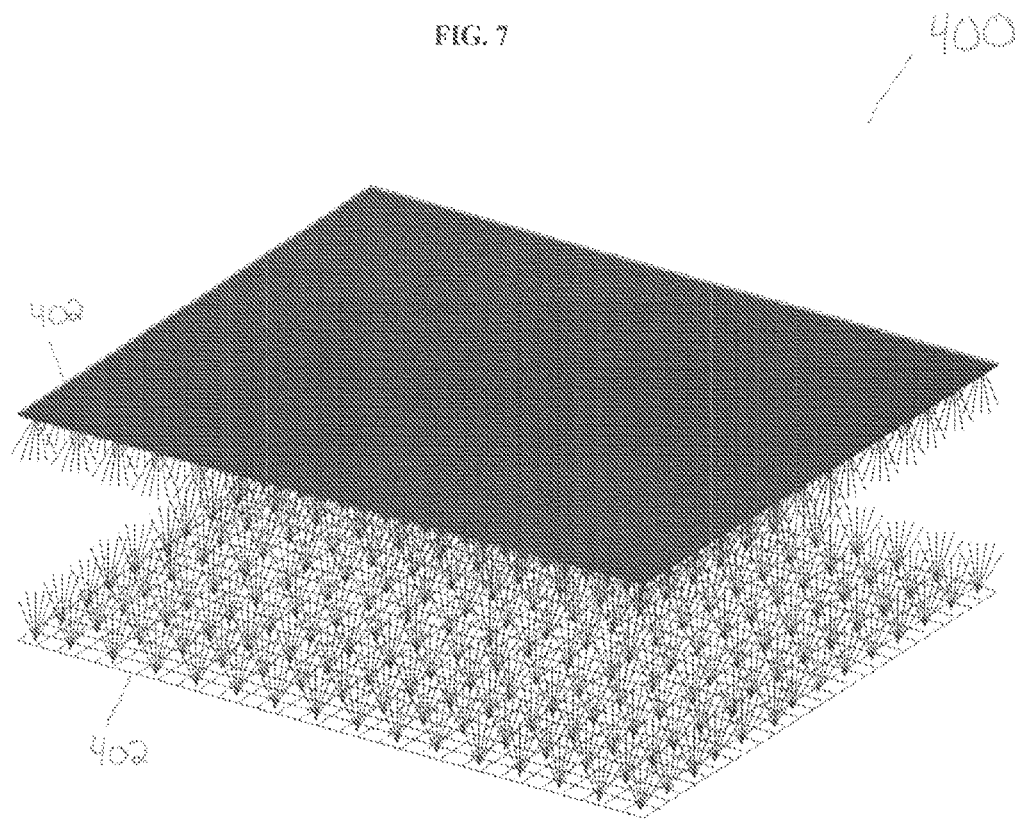
FIG. 7 is a perspective view of an embodiment of a fuel cell for use in a bio-electrochemical system, in accordance with the present disclosure.
Figure 9A:
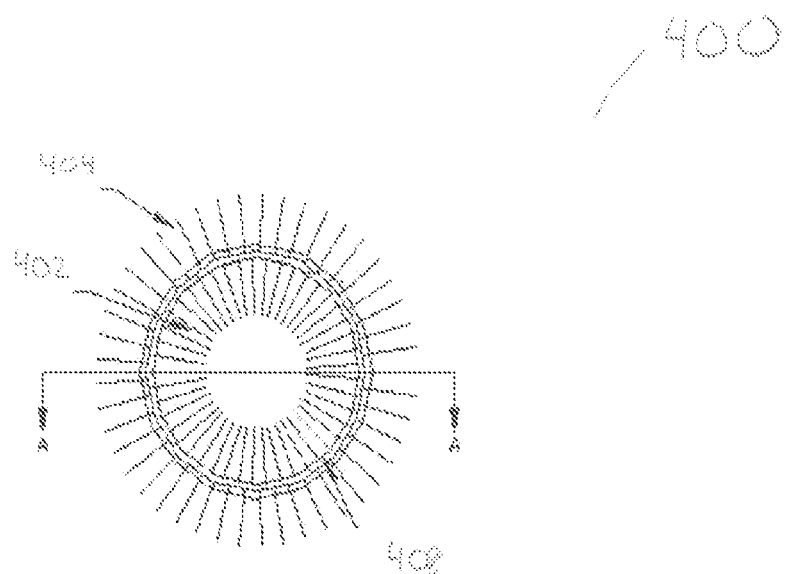
FIG. 9A is a top view of an embodiment of a fuel cell for use in a bio-electrochemical system, in accordance with the present disclosure.
Figure 9B:
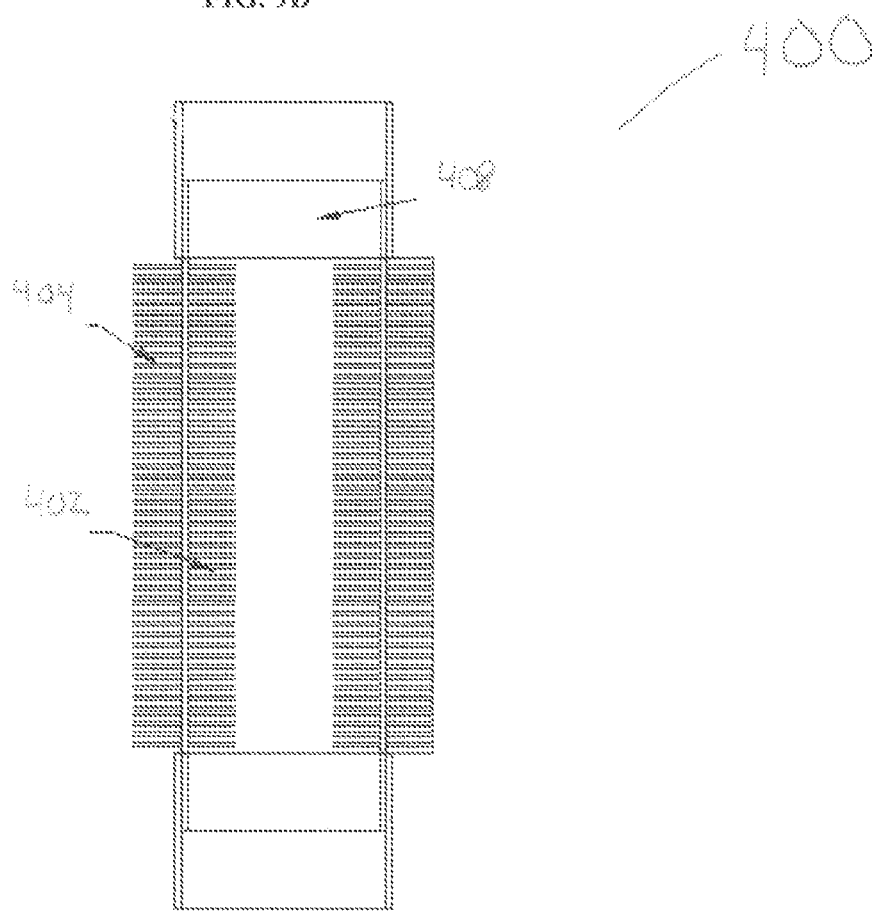
FIG. 9B is a cross-sectional view of an embodiment of a fuel cell for use in a bio-electrochemical system, in accordance with the present disclosure.

Referring now to FIGS. 4A, 4B, 5A, 5B, 6, 7, 8, 9A, and 9B, an electrode 400 for use in a bio-electrochemical system is presented. The electrode 400 includes a first surface 402 and a second surface 404. The first surface is comprised of substantially conductive material 406 that is woven to the second surface 404. A membrane 408 may be disposed between the first surface 402 and the second surface 404. The conductive material 406 may be, for example, carbon fiber. In one embodiment, as shown in FIG. 5A, the first surface 402 has a substantially tubular configuration. In another embodiment, as shown in FIG. 5B, the second surface 404 has a substantially tubular configuration. As shown in FIGS. 6 and 7, the electrode 400 may also include a plurality of first and second surfaces as well as a plurality of membranes.

The electrode 400 may be comprised fabricated from any material 406 with suitable physical and electrical properties. These properties include, but are not limited to, electrical conductivity, flexibility/stiffness, catalytic properties, and biological compatibility. The base weave of the material 406 may be made of a different material from its loops or tufts. For example, a different material may be used because it is cheaper and/or a better conductor of electricity. Additionally, a base material 406 may be used for the electrode 400 with a specialty coating layer applied to enhance the electrode's 400 performance.

The electrode 400 may also be made from a variety of sizes. The shape of the electrode 400 may be varied as well. The electrode 400 may include several characteristic dimensions, such as length, width, depth, fabric weave size (grid spacing), and tuft/loop spacing and density. These dimensions will have direct impact on the performance of the electrode 400 and will be optimized to meet the specific demands of the electrode 400. Further, any type of construction technique may be used for the fabrication of the electrode 400. These techniques include, but are not limited to, needle punching, tufting, axminster, durcam, woven, knitted, rivet head, fusion bonded, and flocked. The specific construction technique used will depend on the materials and exact specifications of the electrode 400.

In one embodiment, the electrode 400 may be provide with a dielectric material 406 in order to divide the electrode 400 into different chambers. The material 406 can serve to selectively allow the transmission of certain soluble chemicals on the basis of size, hydrophobicity, charge, and other properties. The material 406 may be, for example, a sheet polymeric membrane. In order to minimize system space, the membrane may be adhered directly onto the bottom of the electrode 400. This material 406 provides structural support as well as physical separation and selective transport. In another embodiment, For the case of a fuel cell in which ion transport is essential, minimization of distance from the electrode to the selectively permeable membrane decreases the distance, time, and driving force required for diffusion. Therefore, in another embodiment, this construct can be used without modification in planer geometry and can be used in combination with any other type of electrode 400.

Referring to FIG. 5A, the electrode 400 is comprised of a substantially tubular configuration. This configuration may be accomplished by rolling the material 406 with the second surface 404 on the exterior, thereby creating an external tubular electrode 400. This provides for compartmentalization, which is useful in many reactor configurations. A use of this construct would be to use one side of the electrode 400 (inside or outside) as a cathode and the other side as the anode in a fuel cell.

In one embodiment, the electrode 400 can be utilized in a system that is either batch or continuous. The working fluid on either side of the membrane may be gaseous or liquid. The liquid may flow from one section into the other or have no connection. The flow may be in the same or opposite directions and the tube may be oriented in any desired direction. With the external tubular electrode 400, any other electrode may be used on the inside of the electrode 400.

Referring to FIG. 5B, like the electrode of FIG. 5A, the electrode 400 is comprised of an internal tubular architecture by rolling the material 406 with the first surface 402 on the interior. Electrode 400 provides for compartmentalization and its use is similar to the electrode of FIG. 5A.

Referring to FIG. 6, the electrode 400 may be modified to incorporate additional electrodes by placing additional electrode(s) 410 on the back side of the first layer 402. Thus, the back side of the first layer 402 becomes an intermediate layer 408. The dielectric material 406 provides the same functions (support, containment, selective transport) as the electrode of FIG. 5A, but also provides direct electric insulation to the electrode 400 to avoid a short circuit between the two electrodes. Either electrode can still be used for any desired reaction. The architecture of the electrode 400 and the electrode 410 minimize the distance between the two electrodes for accelerated ion transport while simultaneously maximizing the surface area of the electrode. Electron donation occurs at one electrode while electron accepting occurs at the other electrode. It is contemplated that the electrical potential of the donating electrons does not need to be higher than that of the accepting electrons if a power source is placed between the electrodes.

Referring to FIG. 7, the electrode 400 may include multiple layers of stacked electrodes to form a series of chambers. In one embodiment, the anode and cathode (not shown in Figure) electrode 400 reside in the same chamber throughout the surface of the electrode 400. Specifically, the same type (anode or cathode) can be wired together or separately depending on the reactor performance. Electrode 400, can facilitate flow in any direction and has the benefit of large surface area, high throughput, and the capability of achieving a higher volume without sacrificing close electrode spacing.

Referring to FIG. 8, the electrode 400 may have a substantially tubular configuration such that either side of the electrode 400 may be used as a cathode or anode. Further, electrode 400 may be operated in a batch or continuous flow, its orientation may be in any direction, and it may utilize liquid or gas in either its first layer or second layer. It is contemplated that multiple electrodes 400 may be connected in series or parallel. The wiring may connect the electrodes 400 and the different sections depending on the specific application. Further, the concentric electrode 400 may be used with or without an exterior casing, depending on the specific application.

In another embodiment, the incorporation of multiple concentric electrodes 400 into a single reactor results in the production of a shell and tube electrode reactor. This reactor may contain any number of electrodes 400 contained within the shell. As with any shell and tube reactor, the flow may co-flow, counter-flow, or cross-flow. Further, both the tube and the shell side may contain as many passes as desired. Flow may be connected between the two electrodes 400 or unconnected. In addition, the sections and different electrodes 400 may be wired as needed. The shell and tube electrode reactors makes full utilization of space by packing as much reactive surface area as possible into the smallest volume.

Electrode 400 may find a variety of applications. In one embodiment, the high specific surface area makes the electrode 400 ideal for fuel cell applications. Fuel cells are often limited by the area available to catalyze the reaction and by sizes which can be used while maintaining efficiency. The electrode 400 simultaneously maximizes surface area and minimizes electrode separation, thus optimizing the fuel cell. Electrodes 400 are suitable for use in all types of fuel cells. The material of the electrode 400 needs to be selected with the specific electrode and application in mind.

In another embodiment, the electrode 400 may be utilized to increase the productivity of batteries. If the battery is limited by the rate of the electrode, the electrode 400 may increase current. Electrode 400 may also be used for any reaction which requires separated oxidation and reduction steps. Any reactor which makes use of a redox reactor has the possibility to be utilized with the electrode 400. This allows for separation of the half reactions which may allow energy extraction or minimization of energy input. Additionally, this may limit the formation of by-products from side reactions. In addition, the natural compartmentalization of a reactor utilizing the electrode 400 carries the benefit of reduced separations requirement. The electrode 400 is capable of providing electrons (with or without associated ions) into a well-defined environment, thus enhancing the chemical purity of the product. Alternatively, the electrode 400 can act as an electron sink to remove electrons from a system.

In yet another embodiment, biological catalysis may be used with the electrode 400. The electrode 400 maximizes the surface available for microbial attachment. In this application, electrode materials are chosen to be biocompatible with specific attention to attachment properties. Microbial fuel cells are one application of biological catalysis with the electrode 400, but this is not the only process. Biology, especially microbiology, has an extremely diverse set of metabolic capabilities. These unique and efficient processes can be utilized in a reactor with the electrode 400 to produce and convert not only energy but also a wide variety of chemicals from simple to complex.

Further, any application which utilizes an electrode for the transfer of electrons may utilize the electrode 400. More complex devices building upon electrodes may be also constructed with the electrode 400.

Referring to FIG. 10, a fuel cell 500 is presented. The fuel cell 500 is comprised of a first compartment 502, a second compartment 504, a third compartment 506, and a plurality of inputs and outputs within each of the first compartment 502 and the second compartment 504.

The first compartment 502 includes a cascading anode electrode and the second compartment 504 includes a cascading cathode electrode. The fuel cell 500 may have a substantially tubular configuration. In addition, the first compartment 502 may be disposed within the second compartment 504. Further, the first compartment 502 and the second compartment 504 may be disposed within a third compartment 504, which includes an air-cathode.

Fuel cell 500 may be designed for use with existing anaerobic digester (AD) systems. For example, the fuel cell 500 can create a cascading series of electrogenic enhanced AD reactors in which the placement of electrodes, applied voltages, and other attributes of the fuel cell 500 are designed to optimize methane production. In one embodiment, the cascading chambers can be designed to alternate between anode and cathode electrodes. For example, the chambers may be designed to alternate between biological anodes or cathodes and chemical anodes or cathodes. Each compartment of the fuel cell 500 may have a different applied voltage, thereby enabling more complete wastewater treatment at lower cost.

In one embodiment, two electrodes may be used with the fuel cell 500 to retrofit with existing anaerobic digesters by taking the power from a generator to enhance anaerobic digestion, both in terms of the speed of the process and the level to which water may be treated. Because exo-electric bacteria oxidizes organics in wastewater to lower levels than methanogensis, the fuel cell 500 can clean more water using this process than with standard AD systems.

In another embodiment, the fuel cell 500 may control the pH of flow within its compartments. This process may be accomplished by modulating the applied voltage, and other aspects of the fuel cell 500 to ensure the pH remains in the right range for anaerobic digestion, thus optimizing methane production. Further, this pH modulation can be used in combination with another bio-electrochemical system using computers and measurements from the elements of the fuel cell 500.

In another aspect of the invention, a system for the adaptive control of a bio-electrochemical system is presented. The system is comprised of a probe configured to measure stimulus emitted to a fuel cell and a control tool for monitoring levels of the fuel cell. The stimulus may be, for example, any one or more of the following: voltage, current, pH, temperature, internal resistance, activation voltage loses, concentration voltage loses, fuel concentration, ammonia levels, nitrate levels, oxygen levels, and oxygen levels. The control tool is configured to optimize the levels of the fuel cell. The levels may include any one or more of the following: voltage, resistance, electrode spacing, fuel loading rate, and pH of fuel.

It is contemplated that the system can be used to tune various zones of a fuel cell independently. In one embodiment, the system further includes multiple resistors. The system also includes automated feedback control which can be used to maintain various levels within the system. For example, the automated feedback control allows control over the appropriate pH in an operation of a traditional anaerobic digester, or an enhanced anaerobic digester. The pH change can be implemented by changing some aspect of the bio-electrochemical system and thus the rate at which it operates, such as the resistance between electrodes or the applied voltage. In another embodiment, the activity of the bio-electrochemical system can be used to sense and monitor pH through the use of buffers, such as lime for enhanced performance.

It will be understood that various modifications may be made to the embodiments disclosed herein. Therefore, the above description should not be construed as limiting, but merely as illustrative of some embodiments according to the invention.

What is claimed is:

1. A bio-electrochemical system for the generation of methane from an electron donating material, comprising:
    an anaerobic reactor comprising at least one anode, at least one cathode, and at least one methanogenic microbe; wherein at least one of the at least one anode and the at least one cathode comprises a first surface, a second surface and a membrane disposed between the first surface and the second surface, the first surface comprising a substantially conductive material woven to the second surface;
    a power source configured to apply a voltage to the at least one anode and the at least one cathode; and
    an input for receiving an electron donating material into the anaerobic reactor; wherein the system is configured to allow the electron donating material to flow through the at least one anode.

2. The system of claim 1, wherein the system is configured such that the electron donating material flows from the at least one anode to the at least one cathode.

3. The system of claim 2, wherein the electron donating material flows continuously from the at least one anode to the at least one cathode during operation of the bio-electrochemical system.

4. The system of claim 3, wherein the at least one cathode is disposed above the at least one anode, and the continuous flow is upwards from the at least one anode to the at least one cathode.

5. The system of claim 1, wherein the electron donating material comprises at least one material selected from the group consisting of an organic material, ammonia, and wastewater.

6. The method of claim 5, wherein the electron donating material is wastewater.

7. The system of claim 1, wherein the at least one anode and the at least one cathode are separated by a selectively permeable barrier.

8. The system of claim 7, wherein the selectively permeable barrier is a selectively permeably ion exchange membrane.

9. The system of claim 1, wherein the voltage applied is sufficient to create a negative potential at the at least one cathode for facilitating one or more of the following reactions selected from the group consisting of:
    the reduction of hydrogen ions to hydrogen gas;
    $H_2$ formation by secondary fermentative organisms accepting electrons on the at least one cathode; and
    methanogenic microbes generating methane from direct electron acceptance from the at least one cathode.

10. The system of claim 9, wherein the at least one cathode is a biological cathode.

11. The system of claim 10 further comprising at least one exoelectrogenic microbe associated with the biological cathode.

12. The system of claim 9, wherein the at least one methanogenic microbe is a hydrogentrophic microbe.

13. The system of claim 1, further comprising at least one exoelectrogenic microbe associated with the at least one cathode.

14. The system of claim 1, wherein the at least one anode and the at least one cathode are disposed in separate compartments.

15. The system of claim 1, wherein the at least one anode and the at least one cathode are disposed within the same compartment.

16. The system of claim 1, wherein the at least one anode, the at least one cathode, or both, comprise a substantially tubular configuration.

17. The system of claim 16, wherein the at least one anode and the at least one cathode are concentric.

18. The system of claim 1, wherein the at least one anode, the at least one cathode, or both, comprise a substantially planar configuration.

19. The system of claim 1, wherein the power source comprises a generator or a fuel cell powered by methane generated in the reactor.

20. The system of claim 1, wherein the system further comprises a control tool comprising:
    a probe configured to measure one or more stimuli of the system; and
    an automated feedback control configured to maintain one or more levels of the system based on the stimulus measured by the probe.

21. The system of claim 20, further comprising one or more resistors.

22. The system of claim 21, wherein the automated feedback control tool adjusts the pH value of the electron donating material by changing a resistance between the at least one anode and the at least one cathode.

23. The system of claim 20, wherein the control tool adjusts the pH value of the electron donating material by changing the voltage applied to the at least one cathode and/or the at least one anode.

24. The system of claim 20, wherein the stimulus is selected from the group consisting of a spacing between the at least one anode and the at least one cathode, a loading rate of the electron donating material, an electrical current, a temperature of the anaerobic reactor, an oxygen concentration, a nitrate concentration, and an ammonia concentration.

25. The system of claim 20, wherein the automated feedback control is configured to automatically maintain, without human intervention, the one or more levels of the system based on the stimulus measured by the probe.

26. The system of claim 20, wherein the level of the system is selected from the group consisting of resistance between the at least one cathode and the at least one anode, spacing between the at least one cathode and the at least one anode, voltage, fuel loading rate, and pH value of the electron donating material, wherein the pH is adjusted by changing the resistance or voltage.

27. The system of claim 1, wherein the system is used with an anaerobic digester.

28. The system of claim 1, wherein the anaerobic reactor comprising a plurality of anode chambers each comprising at least one anode electrode, a plurality of cathode chambers each comprising at least one cathode electrode; and the cathode and anode chambers are arranged in an alternating and cascading fashion.

29. The system of claim 1, wherein the conductive material is woven to the second surface using carpet-manufacturing techniques and technologies.

30. The system of claim 1, wherein the conductive material is carbon fiber.

31. The system of claim 1, wherein the first surface has a substantially tubular configuration.

32. The system of claim 1, wherein the second surface has a substantially tubular configuration.

33. The system of claim 1, further comprising a plurality of first and second surfaces.

34. The system of claim 1, further comprising a plurality of membranes.

* * * * *